US008777568B2

(12) United States Patent  (10) Patent No.: US 8,777,568 B2
Ellis et al.  (45) Date of Patent: Jul. 15, 2014

(54) APPARATUS AND METHODS FOR COOLING PLATFORM REGIONS OF TURBINE ROTOR BLADES

(75) Inventors: Scott Edmond Ellis, Easley, SC (US); John Wesley Harris, Jr., Taylors, SC (US); Adrian Lional Scott, Greer, SC (US)

(73) Assignee: General Electric Company, Schenectady, NY (US)

( * ) Notice: Subject to any disclaimer, the term of this patent is extended or adjusted under 35 U.S.C. 154(b) by 958 days.

(21) Appl. No.: 12/894,993

(22) Filed: Sep. 30, 2010

(65) Prior Publication Data

US 2012/0082549 A1 Apr. 5, 2012

(51) Int. Cl.
*F01D 5/18* (2006.01)
(52) U.S. Cl.
USPC ............... 416/96 R; 416/97 R; 416/193 A; 29/889.721; 29/402.01; 29/402.03
(58) Field of Classification Search
USPC ....... 415/115–116; 416/95, 96 R, 96 A, 97 R, 416/193 A; 29/889.7, 889.71, 889.72, 29/889.721, 889.722, 402.01, 29/402.03–402.07, 464–469, 514, 525, 29/527.1; 409/131
See application file for complete search history.

(56) References Cited

U.S. PATENT DOCUMENTS

| 3,628,880 | A | * | 12/1971 | Smuland et al. | ............... 415/115 |
| 3,807,892 | A | * | 4/1974 | Frei et al. | ............... 415/116 |
| 3,950,114 | A | | 4/1976 | Helms | |
| 4,712,979 | A | | 12/1987 | Finger | |
| 4,798,514 | A | | 1/1989 | Pask | |
| 5,340,278 | A | | 8/1994 | Magowan | |
| 5,382,135 | A | | 1/1995 | Green | |
| 5,813,835 | A | | 9/1998 | Corsmeier et al. | |
| 5,915,923 | A | * | 6/1999 | Tomita et al. | ............... 416/96 R |
| 6,017,189 | A | * | 1/2000 | Judet et al. | ............... 416/97 R |
| 6,017,819 | A | | 1/2000 | Brigham et al. | |
| 6,019,579 | A | | 2/2000 | Fukuno et al. | |
| 6,120,249 | A | | 9/2000 | Hultgren et al. | |
| 6,190,130 | B1 | | 2/2001 | Fukue et al. | |
| 6,196,799 | B1 | | 3/2001 | Fukue et al. | |
| 6,402,417 | B1 | | 6/2002 | Okamoto | |
| 6,431,833 | B2 | | 8/2002 | Jones | |

(Continued)

FOREIGN PATENT DOCUMENTS

JP 2005-146858 A * 6/2005 ............... F01D 5/18

*Primary Examiner* — Christopher Verdier
(74) *Attorney, Agent, or Firm* — Mark E. Henderson; Ernest G. Cusick; Frank A. Landgraff

(57) ABSTRACT

A platform cooling arrangement in a turbine rotor blade having a platform at an interface between an airfoil and a root, wherein the rotor blade includes an interior cooling passage that in operation, includes at least a high-pressure coolant region and a low-pressure coolant region, and wherein the platform includes a platform underside. The platform cooling arrangement may include: a plate that comprises a plate topside; a channel formed on the plate topside, the channel comprising an upstream end and a downstream end, and being open through the plate topside such that, upon attaching the plate to the platform, the platform underside comprises a channel ceiling; a high-pressure connector that connects the upstream end of the channel to the high-pressure coolant region of the interior cooling passage; and a low-pressure connector that connects the downstream end of the channel to the low-pressure coolant region of the interior cooling passage.

20 Claims, 11 Drawing Sheets

(56) References Cited

U.S. PATENT DOCUMENTS

| | | |
|---|---|---|
| 6,457,935 B1 * | 10/2002 | Antunes et al. ............... 415/115 |
| 6,478,540 B2 | 11/2002 | Abuaf et al. |
| 7,097,424 B2 | 8/2006 | Cunha et al. |
| 7,147,439 B2 | 12/2006 | Jacala et al. |
| 7,198,467 B2 | 4/2007 | Keith et al. |
| 7,347,664 B2 | 3/2008 | Kayser et al. |
| 7,416,391 B2 | 8/2008 | Veltre et al. |
| 2006/0056968 A1 | 3/2006 | Jacala et al. |
| 2007/0116574 A1 * | 5/2007 | Itzel et al. ................ 416/193 A |
| 2007/0189896 A1 | 8/2007 | Itzel et al. |
| 2008/0190114 A1 * | 8/2008 | Surace et al. ............... 416/97 R |
| 2009/0028692 A1 * | 1/2009 | Surace et al. ................ 415/115 |
| 2010/0290921 A1 * | 11/2010 | Mhetras ..................... 416/97 R |

* cited by examiner

APPARATUS AND METHODS FOR COOLING PLATFORM REGIONS OF TURBINE ROTOR BLADES

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

As illustrated, the platform 110 may be substantially planar. More specifically, the platform 110 may have a planar topside 113, which, as shown in FIG. 1, may include an axially and circumferentially extending flat surface. As shown in FIG. 2, the platform 110 may have a planar underside 114, which may also include an axially and circumferentially extending flat surface. The topside 113 and the bottom side 114 of the platform 110 may be formed such that each is substantially parallel to the other. As depicted, it will be appreciated that the platform 110 typically has a thin radial profile, i.e., there is a relatively short radial distance between the topside 113 and the bottom side 114 of the platform 110.

In general, the platform 110 is employed on turbine rotor blades 100 to form the inner flow path boundary of the hot gas path section of the gas turbine. The platform 110 further provides structural support for the airfoil 102. In operation, the rotational velocity of the turbine induces mechanical loading that creates highly stressed regions along the platform 110 that, when coupled with high temperatures, ultimately cause the formation of operational defects, such as oxidation, creep, low-cycle fatigue cracking, and others. These defects, of course, negatively impact the useful life of the rotor blade 100. It will be appreciated that these harsh operating conditions, i.e., exposure to extreme temperatures of the hot gas path and mechanical loading associated with the rotating blades, create considerable challenges in designing durable, long-lasting rotor blade platforms 110 that both perform well and are cost-effective to manufacture.

One common solution to make the platform region 110 more durable is to cool it with a flow of compressed air or other coolant during operation, and a variety of these type of platform designs are known. However, as one of ordinary skill in the art will appreciate, the platform region 110 presents certain design challenges that make it difficult to cool in this manner. In significant part, this is due to the awkward geometry of this region, in that, as described, the platform 110 is a periphery component that resides away from the central core of the rotor blade and typically is designed to have a structurally sound, but thin radial thickness.

To circulate coolant, rotor blades 100 typically include one or more hollow interior cooling passages 116 (see FIGS. 3, 4, 5, and 9) that, at minimum, extend radially through the core of the blade 100, including through the root 104 and the airfoil 102. As described in more detail below, to increase the exchange of heat, such interior cooling passages 116 may be formed having a serpentine path that winds through the central regions of the blade 100, though other configurations are possible. In operation, a coolant may enter the central interior cooling passages via one or more inlets 117 formed in the inboard portion of the root 104. The coolant may circulate through the blade 100 and exit through outlets (not shown) formed on the airfoil and/or via one or more outlets (not shown) formed in the root 104. The coolant may be pressurized, and, for example, may include pressurized air, pressurized air mixed with water, steam, and the like. In many cases, the coolant is compressed air that is diverted from the compressor of the engine, though other sources are possible. As discussed in more detail below, these interior cooling passages typically include a high-pressure coolant region and a low-pressure coolant region. The high-pressure coolant region typically corresponds to an upstream portion of the interior cooling passage that has a higher coolant pressure, whereas the low-pressure coolant region corresponds to a downstream portion having a relatively lower coolant pressure.

In some cases, the coolant may be directed from the interior cooling passages 116 into a cavity 119 formed between the shanks 112 and platforms 110 of adjacent rotor blades 100. From there, the coolant may be used to cool the platform region 110 of the blade, a conventional design of which is presented in FIG. 3. This type of design typically extracts air from one of the interior cooling passages 116 and uses the air to pressurize the cavity 119 formed between the shanks 112/platforms 110. Once pressurized, this cavity 119 then supplies coolant to cooling channels that extend through the platforms 110. After traversing the platform 110, the cooling air may exit the cavity through film cooling holes formed in the topside 113 of the platform 110.

It will be appreciated, however, that this type of conventional design has several disadvantages. First, the cooling circuit is not self-contained in one part, as the cooling circuit is only formed after two neighboring rotor blades 100 are assembled. This adds a great degree of difficulty and complexity to installation and pre-installation flow testing. A second disadvantage is that the integrity of the cavity 119 formed between adjacent rotor blades 100 is dependent on how well the perimeter of the cavity 119 is sealed. Inadequate sealing may result in inadequate platform cooling and/or wasted cooling air. A third disadvantage is the inherent risk that hot gas path gases may be ingested into the cavity 119 or the platform itself 110. This may occur if the cavity 119 is not maintained at a sufficiently high pressure during operation. If the pressure of the cavity 119 falls below the pressure within the hot gas path, hot gases will be ingested into the shank cavity 119 or the platform 110 itself, which typically damages these components as they were not designed to endure exposure to the hot gas-path conditions.

FIGS. 4 and 5 illustrate another type of conventional design for platform cooling. In this case, the cooling circuit is contained within the rotor blade 100 and does not involve the shank cavity 119, as depicted. Cooling air is extracted from one of the interior cooling passages 116 that extend through the core of the blade 110 and directed aft through cooling channels 120 formed within the platform 110 (i.e., "platform cooling channels 120"). As shown by the several arrows, the cooling air flows through the platform cooling channels 120 and exits through outlets in the aft edge 121 of the platform 110 or from outlets disposed along the suction side edge 122. (Note that in describing or referring to the edges or faces of the rectangular platform 110, each may be delineated based upon its location in relation to the suction face 105 and pressure face 106 of the airfoil 102 and/or the forward and aft directions of the engine once the blade 100 is installed. As such, as one of ordinary skill in the art will appreciate, the platform may include an aft edge 121, a suction side edge 122, a forward edge 124, and a pressure side edge 126, as indicated in FIGS. 3 and 4. In addition, the suction side edge 122 and the pressure side edge 126 also are commonly referred to as "slashfaces" and the narrow cavity formed therebetween once neighboring rotor blades 100 are installed may be referred to as a "slashface cavity".)

It will be appreciated that the conventional designs of FIGS. 4 and 5 have an advantage over the design of FIG. 3 in that they are not affected by variations in assembly or installation conditions. However, conventional designs of this nature have several limitations or drawbacks. First, as illustrated, only a single circuit is provided on each side of the airfoil 102 and, thus, there is the disadvantage of having limited control of the amount of cooling air used at different locations in the platform 110. Second, conventional designs of this type have a coverage area that is generally limited. While the serpentine path of FIG. 5 is an improvement in terms of coverage over FIG. 4, there are still dead areas within the platform 110 that remain uncooled. Third, to obtain better coverage with intricately formed platform cooling channels 120, manufacturing costs increase dramatically, particularly if the cooling channels having shapes that require a casting process to form. Fourth, these conventional designs typically dump coolant into the hot gas path after usage and before the coolant is completely exhausted, which negatively affects the efficiency of the engine. Fifth, conventional designs of this nature generally have little flexibility. That is, the channels 120 are formed as an integral part of the platform 110 and provide little or no opportunity to change their function or configuration as operating conditions vary. In addition, these types of conventional designs are difficult to repair or refurbish.

As a result, conventional platform cooling designs are lacking in one or more important areas. There remains a need for improved apparatus, systems, and methods that effectively and efficiently cool the platform region of turbine rotor blades, while also being cost-effective to construct, flexible in application, and durable.

BRIEF DESCRIPTION OF THE INVENTION

The present application thus describes a platform cooling arrangement in a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises at least a high-pressure coolant region and a low-pressure coolant region, and wherein the platform includes a platform underside along an inboard surface. The platform cooling arrangement may include: a plate that comprises a plate topside, the plate topside being detachably connected to the platform underside; a channel formed on the plate topside, the channel comprising an upstream end and a downstream end, and being open through the plate topside such that, upon attaching the plate to the platform, the platform underside comprises a channel ceiling; a high-pressure connector that connects the upstream end of the channel to the high-pressure coolant region of the interior cooling passage; and a low-pressure connector that connects the downstream end of the channel to the low-pressure coolant region of the interior cooling passage.

The present application further describes a method of creating a platform cooling arrangement for a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises at least a high-pressure coolant region and a low-pressure coolant region, and wherein the platform includes a platform underside along an inboard surface. The method may include the steps of: machining a high-pressure connector that connects an outlet to a high-pressure coolant region of the interior cooling passage, the outlet being positioned in a first predetermined location inboard of the platform; machining a low-pressure connector that connects an inlet to the low-pressure coolant region of the interior cooling passage, the inlet being positioned in a second predetermined location inboard of the platform; affixing a topside of a plate to the platform underside, the plate comprising a channel formed on the plate topside that includes an upstream end and a downstream end, the channel being open through the plate topside such that, upon attaching the plate to the platform, the platform underside comprises a channel ceiling; wherein the plate is configured such that the upstream end of the channel connects to the outlet of the high-pressure connector, and the downstream end of the channel connects to the inlet of the low-pressure connector; and wherein the channel comprises a serpentine channel.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
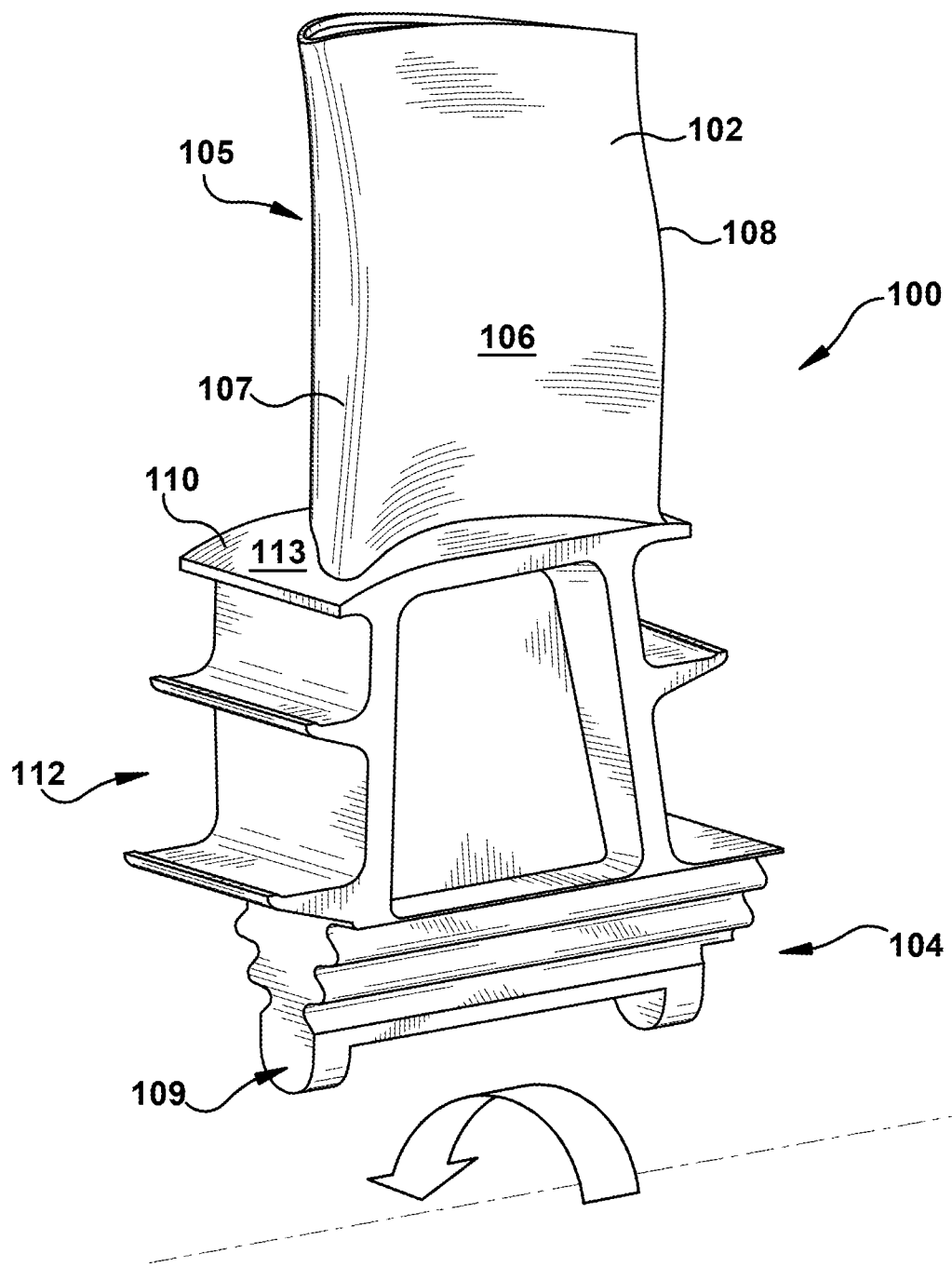
FIG. 1 illustrates a perspective view of an exemplary turbine rotor blade in which embodiments of the present invention may be employed.
Figure 2:
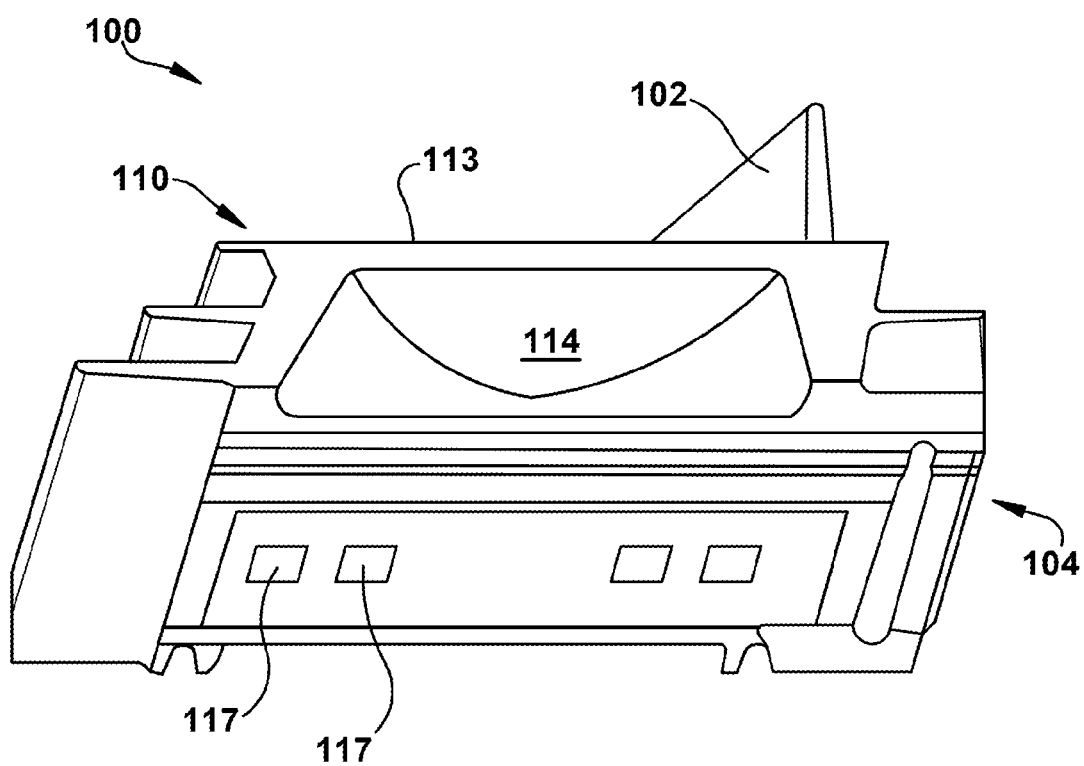
FIG. 2 illustrates an underside view of a turbine rotor blade in which embodiments of the present invention may be used.
Figure 3:
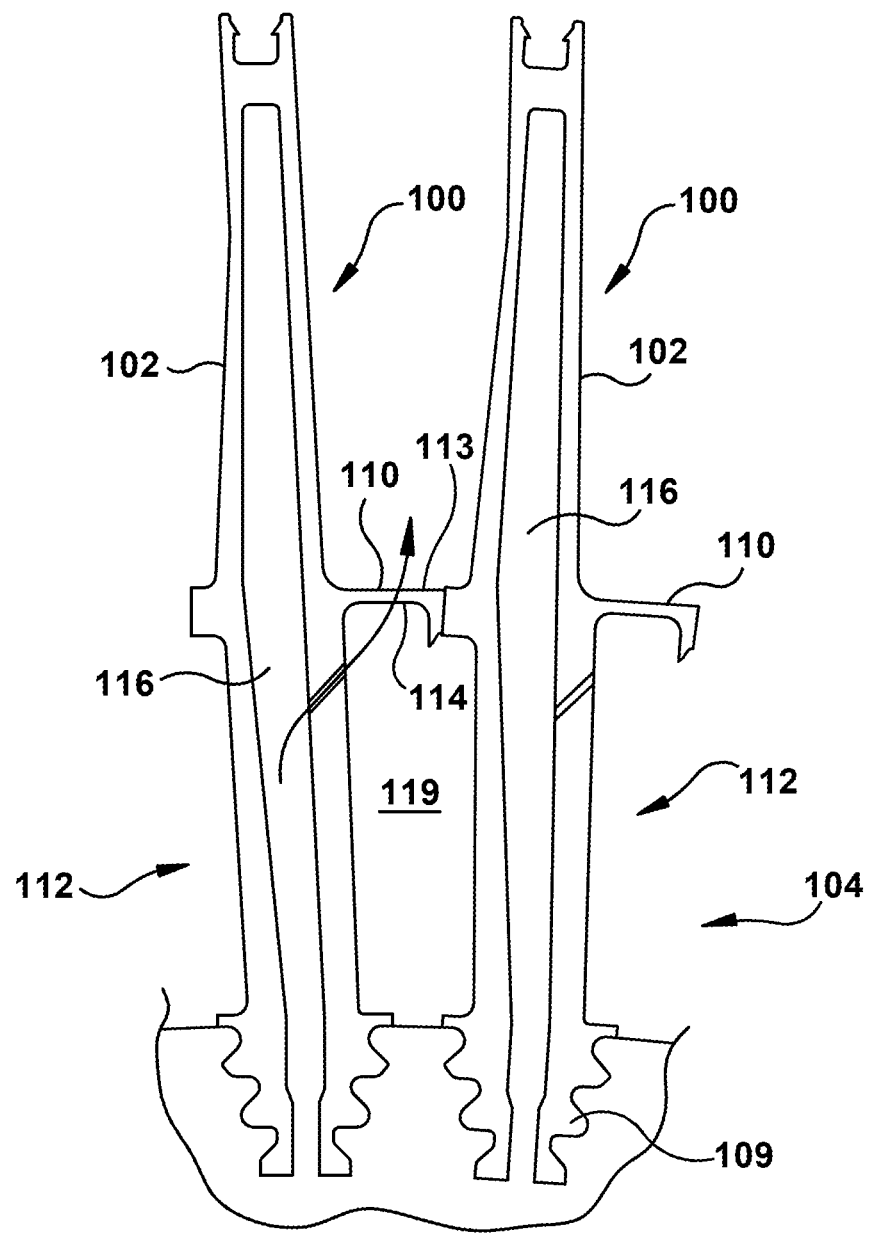
FIG. 3 illustrates a sectional view of neighboring turbine rotor blades having a cooling system according to conventional design.
Figure 4:
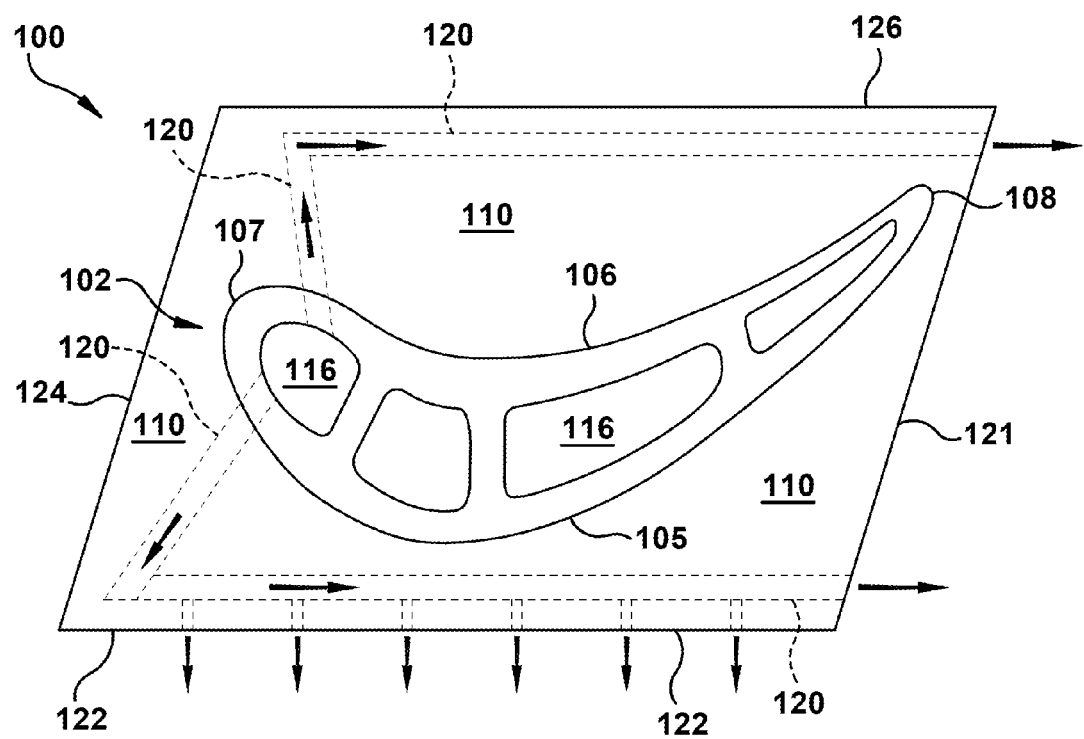
FIG. 4 illustrates a top view of a turbine rotor blade having a platform with interior cooling passages according to conventional design.
Figure 5:
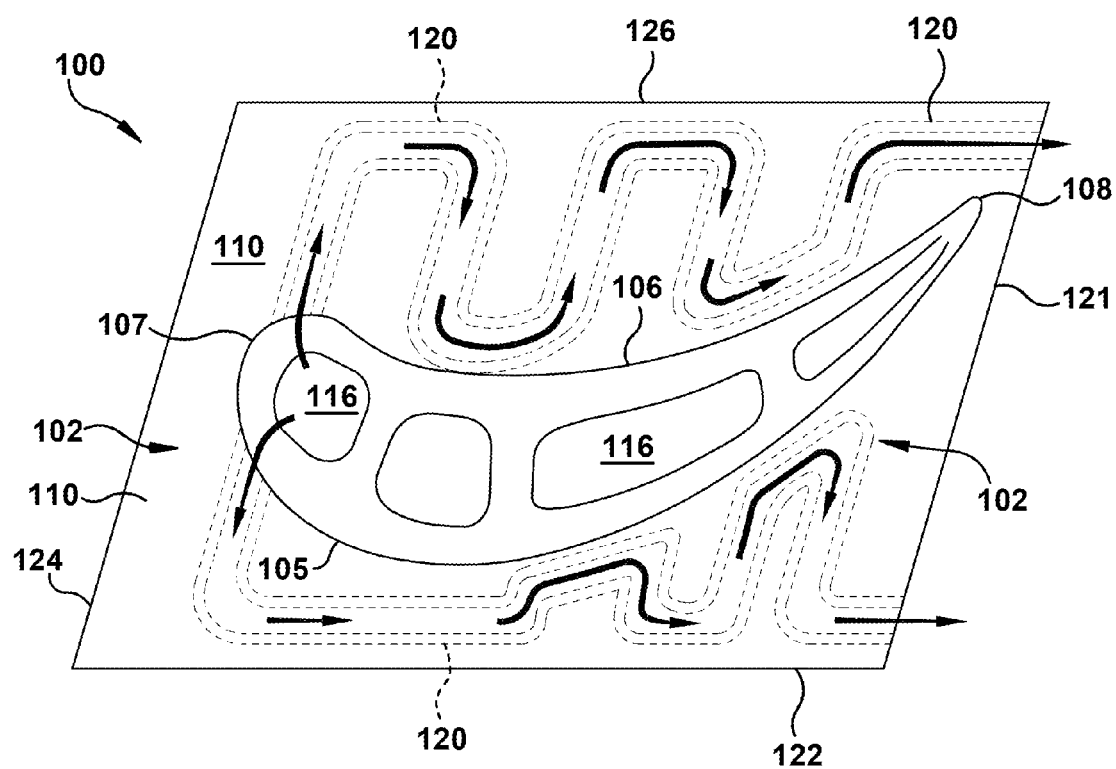
FIG. 5 illustrates a top view of a turbine rotor blade having a platform with interior cooling passages according to an alternative conventional design.
Figure 6:
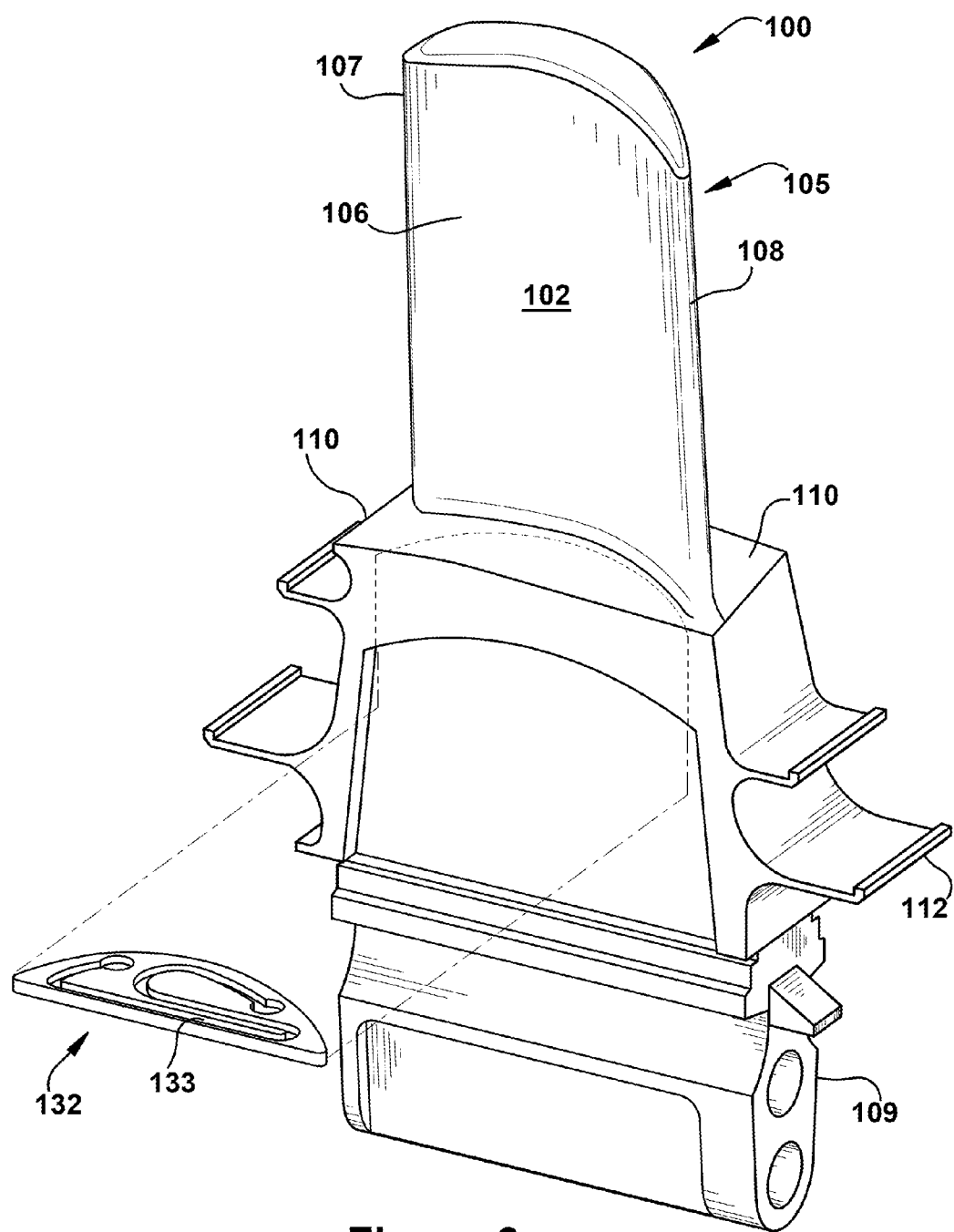
FIG. 6 is a perspective view of a turbine rotor blade and a plate with a serpentine cooling channel according to an embodiment of the present application.
Figure 8:
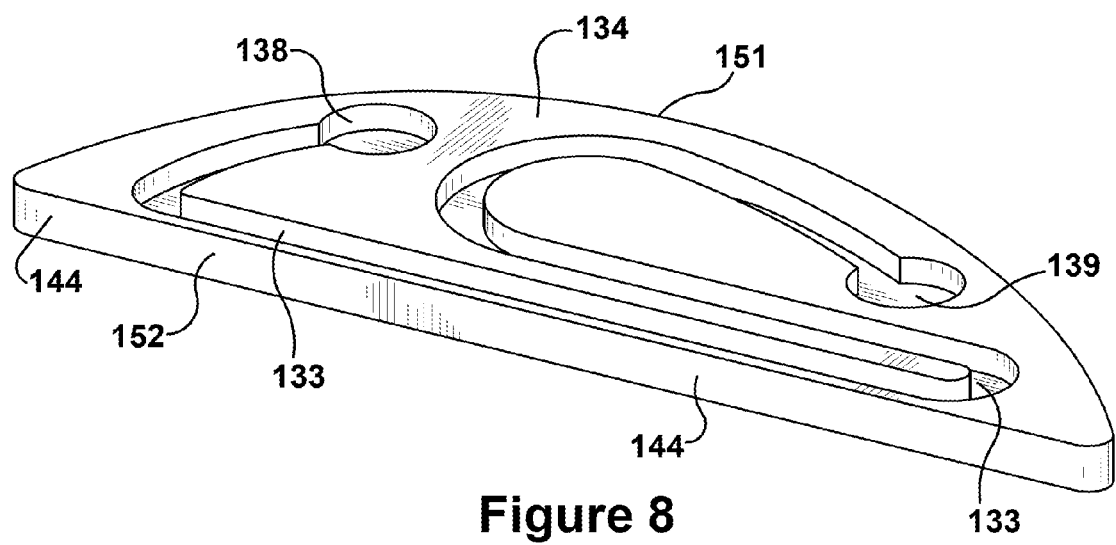
FIG. 8 is a perspective view of a plate with a serpentine cooling channel according to an embodiment of the present application.
Figure 9:
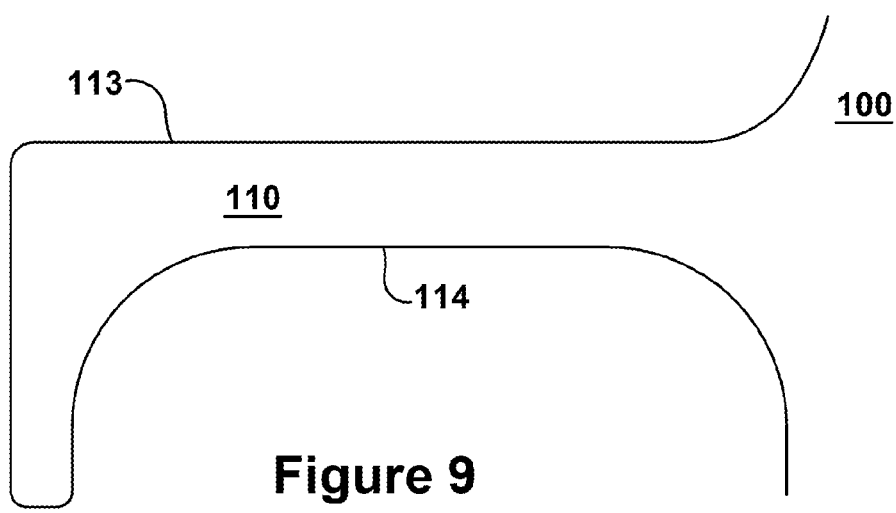
FIG. 9 is a cross-sectional side view of an unmodified conventional platform in which embodiments of the present application may be practice.

It will be appreciated that turbine blades that are cooled via the internal circulation of a coolant typically include an interior cooling passage 116 that extends radially outward from the root, through the platform region, and into the airfoil, as described above in relation to several conventional cooling designs. It will be appreciated that certain embodiments of the present invention may be used in conjunction with conventional coolant passages to enhance or enable efficient active platform cooling, and the present invention is discussed in connection with a common design: an interior cooling passage 116 having a winding or serpentine configuration. As depicted in FIGS. 6, 8, and 9, the serpentine path is typically configured to allow a one-way flow of coolant and includes features that promote the exchange of heat between the coolant and the surrounding rotor blade 100. In operation, a pressurized coolant, which typically is compressed air bled from the compressor (though other types of coolant, such as steam, also may be used with embodiments of the present invention), is supplied to the interior cooling passage 116 through a connection formed through the root 104. The pressure drives the coolant through the interior cooling passage 116, and the coolant convects heat from the surrounding walls.

As the coolant moves through the interior cooling passage 116, it will be appreciated that it loses pressure, with the coolant in the upstream portions of the interior cooling passage 116 having a higher pressure than coolant in downstream portions. As discussed in more detail below, this pressure differential may be used to drive coolant across or through interior cooling passages formed in the platform. It will be appreciated that the present invention may be used in rotor blades 100 having internal interior cooling passages of different configurations and is not limited to interior cooling passages having a serpentine form. Accordingly, as used herein, the term "interior cooling passage" or "interior cooling passage" is meant to include any passage or hollow channel through which coolant may be circulated in the rotor blade. As provided herein, the interior cooling passage 116 of the present invention extends to at least to the approximate radial height of the platform 116, and may include at least one region of relatively higher coolant pressure (which, hereinafter, is referred to as a "region of high pressure" and, in some cases, may be an upstream section within a serpentine passage) and at least one region of relatively lower coolant pressure (which, hereinafter, is referred to as a "region of low pressure" and, relative to the region of high pressure, may be a downstream section within a serpentine passage).

In general, the various designs of conventional internal interior cooling passages 116 are effective at providing active cooling to certain regions within the rotor blade 100. However, as one of ordinary skill in the art will appreciate, the platform region proves more challenging. This is due, at least in part, to the platform's awkward geometry—i.e., its narrow radial height and the manner in which it juts away from the core or main body of the rotor blade 100. However, given its exposures to the extreme temperatures of hot gas path and high mechanical loading, the cooling requirements of the platform are considerable. As described above, conventional platform cooling designs are ineffective because they fail to address the particular challenges of the region, are inefficient with their usage of coolant, and/or are costly to fabricate.

Figure 10:
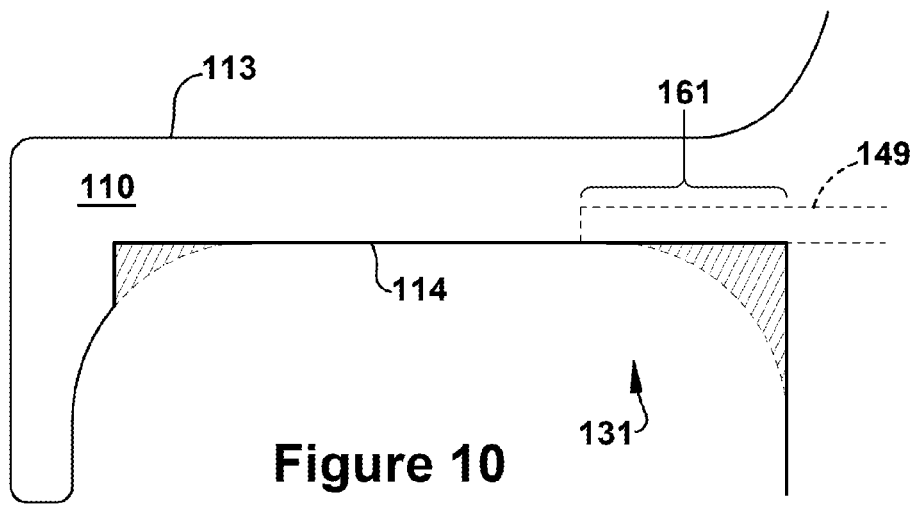
FIG. 10 is cross-sectional side view of the platform of FIG. 9 illustrating how the platform may be modified to accept an exemplary plate embodiment of the present application.
Figure 11:
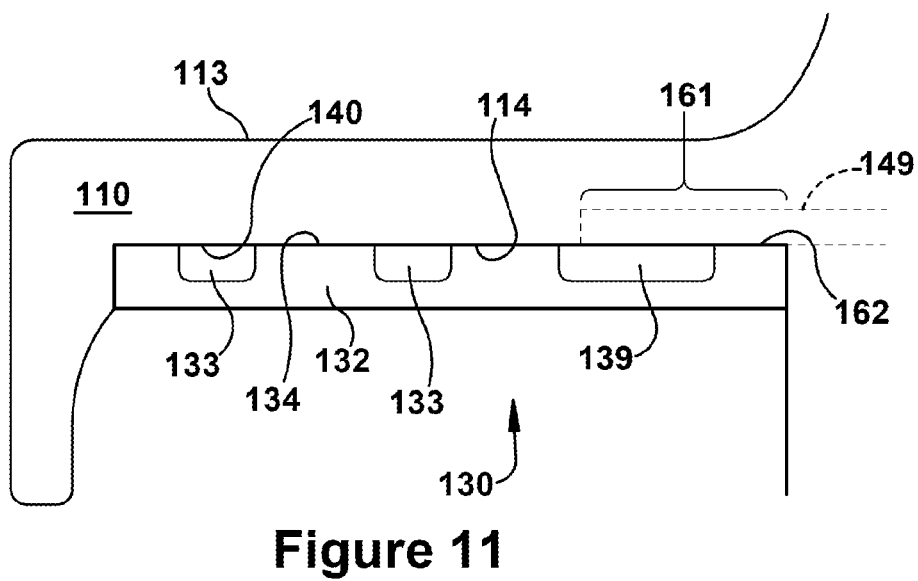
FIG. 11 is a cross-sectional side view of the platform of FIG. 9 illustrating the plate as it may be attached to the modified plate of FIG. 10 according to an exemplary embodiment of the present application.

Referring now to FIGS. 6 through 14, several views of exemplary embodiments of the present invention are provided. FIG. 6 provides a perspective view of a turbine rotor blade 100 and a plate 132 with a serpentine cooling channel 133 according to an embodiment of the present application. As shown, the plate 132 may attach to the platform 110. More specifically, the plate 132 may attach to the platform underside 114. Like the topside 113 of a platform 110, a platform underside 114 may include an axially and circumferentially extending planar surface. (Note that "planar," as used herein, means approximately or substantially in the shape of a plane. For example, one of ordinary skill in the art will appreciate that platforms may be configured to have an outboard surface that is slight curved and convex, with the curvature corresponding to the circumference of the turbine at the radial location of the rotor blades. As used herein, this type of platform shape is deemed planar, as the radius of curvature is sufficiently great to give the platform a flat appearance.) In an embodiment of the present application, a flat pocket 131 may be located in the platform underside 114, which is shown in FIGS. 9 through 11. The flat pocket 131 may be formed by one or more manufacturing methods, such as, but not limited to, machining, casting, and the like. For example, an existing rotor blade may be machined such that an appropriate flat pocket 131 is formed. In an embodiment of the present application, the flat pocket 131 may be located on a region of the platform underside 114 that substantially corresponds with the pressure side of the airfoil 102 of the blade 100. The flat pocket 131 may be configured to accept a plate 132 according to the present invention.

Figure 12:
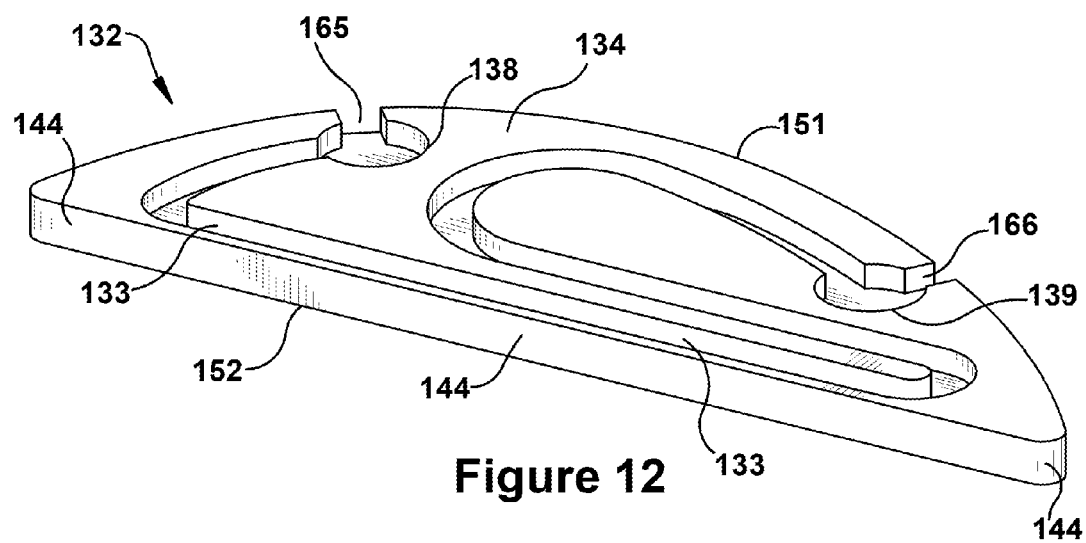
FIG. 12 is a perspective view of a plate with a serpentine cooling channel according to an alternative embodiment of the present application.
Figure 13:
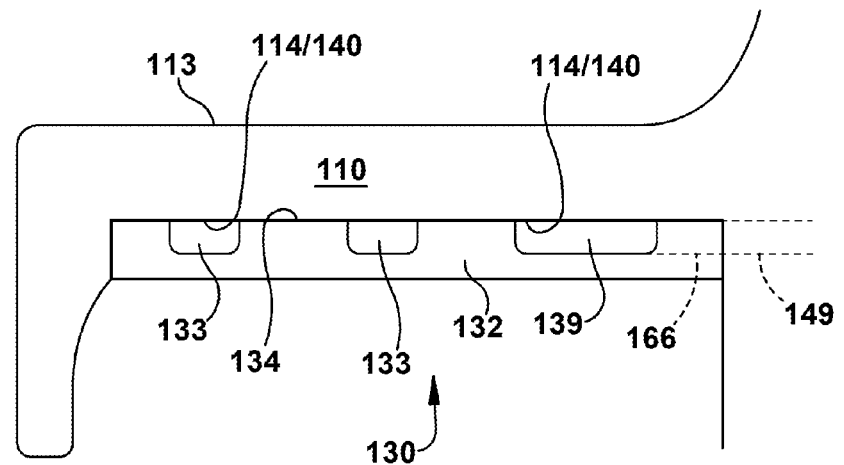
FIG. 13 is a cross-sectional side view of a platform illustrating the plate of FIG. 12 as it may be attached according to an alternative embodiment of the present application.

As illustrated in FIGS. 8 and 12, the plate 132 may include a radially thin structure having a planar topside 134 on which the channel 133 is formed. The planar topside 134 may extend in the axial and circumferential direction, once installed on the platform underside 114. In one embodiment, the channel 133 comprises a serpentine or winding path, though other configurations are possible. The channel 133, as shown, is formed on the surface of the plate 132, i.e., not fully contained within the plate 132. The channel 133, thus, may be described as remaining open through the plate topside 134. It will be appreciated that, upon attaching the plate 132 to the platform underside 114, the platform underside 114 then encloses the channel 133. That is, the platform underside 114 may provide a ceiling 140 to the channel 133 once the two surfaces are joined.

The channel 133 may have an upstream end 138 and a downstream end 139. A high-pressure connector 148 may connect the upstream end 138 of the channel 133 to the high-pressure coolant region of the interior cooling passage 116. A low-pressure connector 149 may connect the downstream end 139 of the channel 133 to the low-pressure coolant region of the interior cooling passage 116. In relation to the forward and aft directions of the rotor blade 100, the upstream end of 138 the channel 133 may have a relatively forward position and the downstream end 139 of the channel 133 may have an aft position.

Figure 7:
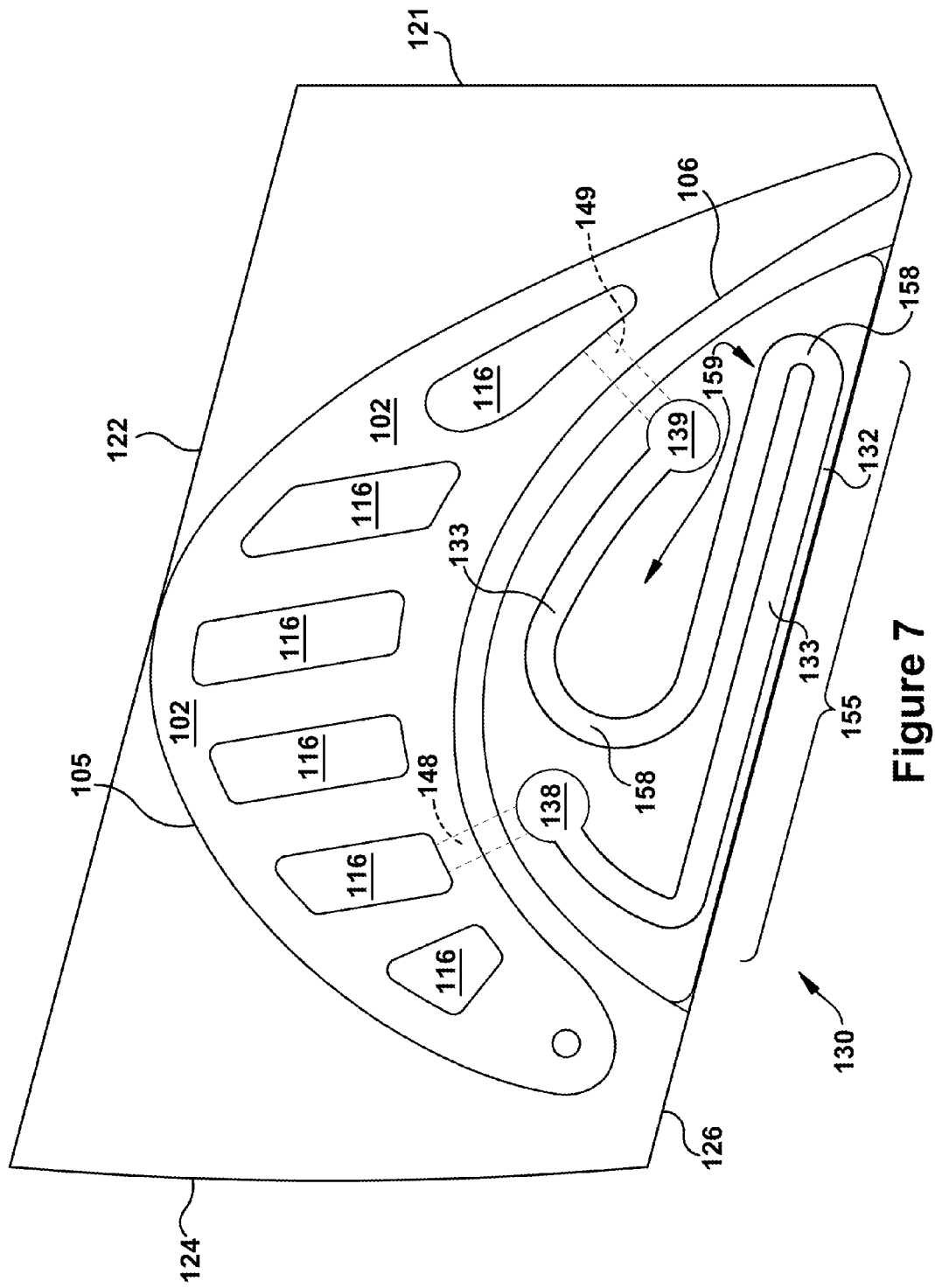
FIG. 7 is a cross-sectional top view of a platform cooling arrangement according to an embodiment of the present application.

As stated, the airfoil 102 may be described as having a pressure side 106 and a suction side 105, and a pressure side slashface 126 may comprise the platform edge that corresponds with the pressure side 106 of the airfoil 102. In one embodiment, the plate 132 is located on a region of platform underside 114 that corresponds with the pressure side of the airfoil, as shown in FIG. 7. Further, as shown in FIGS. 7, 8 and 12, in profile (i.e., from the vantage point of FIG. 7), the plate 132 may include a curved edge 151 and a straight edge 152. It will be appreciated that the curved edge 151 may approximately correspond in shape to the curved profile of the airfoil 102 where the pressure side 106 of the airfoil 102 connects to the platform 110. Whereas, the straight edge 151 may approximately correspond in shape to the linear profile of the pressure side slashface 126. More particularly, in some embodiments, the positioning of the curved edge 151 and the straight edge 152 of the plate 132 corresponds to the positioning of the curved profile of the airfoil 102 and the linear profile of the pressure side slashface 126.

In some embodiments, the channel 133 is formed to include a slashface section 155. The slashface section 155 may include a section of the channel that resides in proximity and parallel to the straight edge 152 of the plate 132 (and, thus, once installed, reside in proximity to the pressure side slashface 126, as illustrated in FIG. 7). The upstream end 138 of the slashface section 155 may reside in proximity to the upstream end 138 of the channel 133. The length that the slashface section 155 extends down the straight edge 152 of the plate 132 may be referred to as a "slashface section channel length". In preferred embodiments, the slashface section channel length may be at least 0.5 of the length of the slash face 126. More preferably, the slashface section channel length may be greater than 0.75 of the length of the slashface 126. It will be appreciated that that having this section of the channel located in this manner offers certain performance advantages. For example, because the slashface section 155 is located near the upstream end 138 of channel 133, the coolant supply must flow through this region first, which results in it receiving coolant having a lower temperature that downstream sections of the channel 133. As this is a platform region that experiences some of the highest operating temperatures and a traditionally troublesome area to cool because it is removed from the central areas of the rotor blade 100, targeting this area in this manner proves a desired cooling strategy.

From the slashface section, the channel 133 includes a switchback 158 (i.e., a sharp turn of about 180°) and, following the switchback 158, extends into the central areas of the plate 132, which may be referred to as an internal section 159 of the channel 133. The internal section 159 may include a linear section downstream of the first switchback 158 and, downstream of that, a second switchback 158, the combination of which effectively provides coverage to the central areas of the plate 132. The second switchback 158 may reside in proximity to the downstream end 139 of the channel 133.

In some embodiments, the upstream end 138 of the channel 133 includes an upstream plenum. In general, the upstream plenum 138 includes an area of increased channel width. As shown, in profile, the upstream plenum 138 may be circular in nature. In operation, the upstream plenum 138 provides a large volume where multiple coolant feeds (if present) may be collected and then directed into the channel 133. Also, the upstream plenum 138 provides a larger target profile by which the connection with the high-pressure connector 148 may be made. Similarly, in some embodiments, the downstream end 139 of the channel 133 includes a downstream plenum. In general, the downstream plenum 139 also includes an area of increased channel width, and, as shown, the downstream plenum 139 may have a circular profile. The downstream plenum 139 provides a larger target profile by which the connection with the low-pressure connector 149 may be made.

As stated, the high-pressure connector 148 connects to the upstream end 138 of the channel 133 and the low-pressure connector 149 connects to the downstream end 139 of the channel 133. This connection may be made using several configurations. For example, in one preferred embodiment (as shown in FIG. 8), the plate 132 comprises an outer sidewall 144 that extends uninterrupted around the periphery of the plate 132. In this case, as depicted in FIGS. 9 through 11, the connectors 148, 149 may include a section that is internal to the blade 100 and an underside channel 161 formed on the platform 110. More particularly, the underside channel 161 comprises a channel formed on the surface of the platform underside 114. It will be appreciated that, similar to the channel 133, the underside channel 161 remains open through the surface on which it is located, which, in this case, is the platform underside 114. The underside channel 161 only becomes enclosed once the plate 132 is attached to the platform 110. It will be appreciated that, once the plate 132 is attached, the plate topside 134 may be described as functioning as the floor 162 of the underside channel 161. As stated, this configuration may be used on both the high-pressure connector 148 and the low-pressure connector 149. In the case of the high-pressure connector 148, the downstream end of the underside channel 161 corresponds in location to the upstream end 138 of the channel 133, though each is offset in the radial direction. In the case of the low-pressure connector 149, the upstream end of the underside channel 161 corresponds in location to the downstream end 139 of the channel 133, though each is offset in the radial direction.

In another embodiment, the outer sidewall 144 may include a sidewall inlet 165 and a sidewall outlet 166 that are form through the outer sidewall 144, as shown in FIG. 12. In this case, the sidewall inlet 165 may directly connect the upstream end 138 of the channel 133 to the high-pressure connector 148 through the outer sidewall 144. And, the sidewall outlet 166 may directly connect the downstream end 139 of the channel 133 to the low-pressure connector 149 through the outer sidewall 144.

As shown in FIGS. 10 and 11, it will be appreciated that in certain embodiments, the high-pressure connector 148 may include a first underline channel 161 formed on the platform underside 114, the first underside channel 161 being open through the platform underside 114 such that, upon attaching the plate 132 to the platform underside 114, the plate topside 134 becomes an underside channel floor 162 for at least a portion of the first underside channel 161. Additionally, the low-pressure connector 149 may include a second underside channel 161 formed on the platform underside 114, the second underside channel 161 being open through the platform underside 114 such that, upon attaching the plate 132 to the platform underside 114, the plate topside 134 becomes an underside channel floor 162 for at least a portion of the second underside channel 161. As also shown, the downstream end of the first underside channel 161 may overlap axially and circumferentially, at least in part, with the upstream end 138 of the channel 133, while each is offset from the other in the radial direction. Likewise, the upstream end of the second underside channel 161 may overlap axially and circumferentially, at least in part, with the downstream end 139 of the channel 133, while each is offset from the other in the radial direction. The plate 132 may be attached to the platform underside 114 using various techniques. In some embodiments, the plate 132 is detachedly attached to the platform 110. As used herein, this type of attachment is meant to include any attachment that may reasonable be reversed, such that the plate 132 and/or the blade 100 may be reused. This may include, for example, certain types of welding, brazing, adhesives, mechanical retainment, and the like. As part of attaching the plate, conventional steps may be taken to seal the formed channel 133 and the connections it makes with the connectors 148, 149 may substantially result in a closed coolant circuit between the high-pressure connector 148 and the low-pressure connector 149. Thus, substantially all of the coolant flowing into the channel 133 from the high-pressure connector 148 is returned to the interior cooling passage 116 via the low-pressure connector 149 for further use. Those of ordinary skill in the art will appreciate that any sealing means may be used between the plate 132 and the platform underside 114. For example, mechanical gasket, chemical sealant and the like may be used.

Those of ordinary skill in the art will appreciate that the platform cooling arrangement 130 may be used to efficiently retrofit existing turbine rotor blades because the plate 132 and the platform 110 are non-integrally formed components. Further, the platform cooling arrangement 130 may utilize existing interior cooling passages 116 of turbine rotor blades 110, providing the flexibility to employ embodiments of the present invention in existing blades or new ones. The plate 132 is also adjustable through post cast changes. Various aspects of the plate 132 and the channel 133 may be altered to optimize cooling of the platform 110. Thus, the platform cooling arrangement 130 may be tailor-made to suit various turbine rotor blade configurations. The platform cooling arrangement 130 may also be cost effectively and efficiently manufactured as the plate 132 may be manufactured separately from the various components of turbine rotor blades. Moreover, the plate 132 may be prefabricated and then assembled on site.

Figure 14:
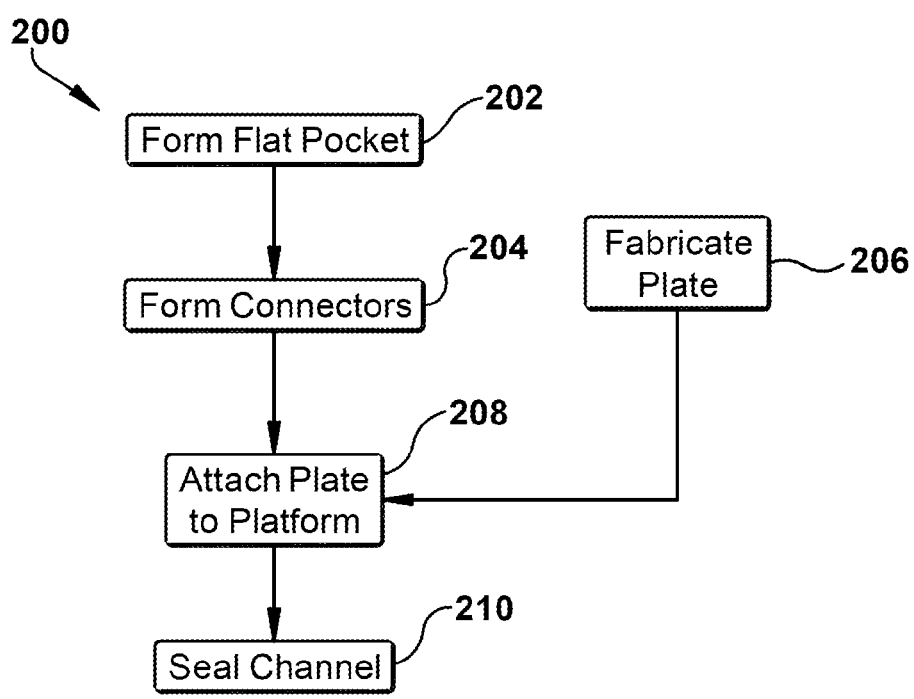
FIG. 14 is an exemplary method of creating a platform cooling arrangement according to an embodiment of the present application.

FIG. 14 illustrates a flow diagram 200 depicting an exemplary method of creating the platform cooling arrangement 130, according to an embodiment of the present application. The flow diagram 200 may begin at a step 202 where, if necessary, the flat pocket 131 is machined in the platform underside 114 in a predetermined location. In some embodiments, the preferred location corresponds with the pressure side 126 of the airfoil 102. This machining process is illustrated in FIGS. 9 through 11. FIG. 9 represents the cross-section of a platform 110 before the pocket 131 is formed. As shown, many existing platforms 110 include a planar underside 114, however some machining may be needed to provide enough clearance for a plate 132 having the size to provide a desired cooling coverage area. FIG. 10 illustrates the areas that may be targeted for removal. The flat pocket 131 may have a profile shape that substantially corresponds with the profile of the pressure side 106 of the airfoil 102, which may also correspond with the profile of the formed plate 132. It will be appreciated that, in some cases, the flat pocket 131 may already be present in the blade 100 as a cast-in feature.

At step 204, the high-pressure connector 148 and the low-pressure connector 149 may be formed. The high-pressure connector 148 may have a predetermined configuration and location such that it connects the high-pressure coolant region of the interior cooling passage 116 to the eventual location of the upstream end 138 of the plate channel 133 or the sidewall inlet 165 of the plate 132, whatever the case may be. In the case where the sidewall inlet 165 is not present, the formation of the high-pressure connector 148 may include the formation of an underside channel 161, as described above. Likewise, the low-pressure connector 149 may have a predetermined configuration and location such that it connects the low-pressure coolant region of the interior cooling passage 116 to the eventual location of the downstream end 139 of the plate channel 133 or the sidewall outlet 166, whatever the case may be. In the case where the sidewall outlet 166 is not present, the formation of the low-pressure connector 149 may include the formation of an underside channel 161, as described above. It will be appreciated that the formation of the connectors 148, 149 may be completed using a relatively inexpensive machining process, particularly given the access that is available to the relevant area of the blade 100 once the formation of the flat pocket 131 is completed and before the plate 132 is attached.

At a step 206, the plate 132 may be fabricated according to desired specifications. It will be appreciated that fabricating the plate 132 separately simplifies the manufacturing process. For example, the channel 133 may be formed on the plate 132 using a simple machining or casting process. Whereas, forming the same channel within an integrally formed platform typically would require a much more complicated and expensive casting process.

At a step 208, the plate 132 may be attached to the platform underside 114 so that the plate 132 resides inboard of the platform underside 114, thereby enclosing the channel 133 between the plate 132 and the platform underside 114. The plate 132 may be attached to the platform underside 114 such that the plate 132 resides in the flat pocket 131. Finally, at a step 210, additional steps may be taken to seal the channel 133. As stated, sealing the channel 133 and the connections it makes with the connectors 148, 149 may substantially result in a closed coolant circuit between the high-pressure connector 148 and the low-pressure connector 149. It will be appreciated that the current invention takes advantage of the centrifugal loading that occurs during operation to enhance the seal created between the plate 132 and the platform underside 114, particularly when one or more underside channels 161 are used to connect the channel 133 to the coolant supply.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A platform cooling arrangement in a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises at least a high-pressure coolant region and a low-pressure coolant region, and wherein the platform includes a platform underside along an inboard surface, the platform cooling arrangement comprising:
 a plate that comprises a plate topside, the plate topside being detachably connected to the platform underside,
 a channel formed on the plate topside, the channel comprising an upstream end and a downstream end, and being open through the plate topside such that, upon attaching the plate to the platform, the platform underside comprises a channel ceiling;
 a high-pressure connector that connects the upstream end of the channel to the high-pressure coolant region of the interior cooling passage; and
 a low-pressure connector that connects the downstream end of the channel to the low-pressure coolant region of the interior cooling passage.

2. The platform cooling arrangement according to claim 1, wherein:
 the plate and the platform comprise non-integrally formed components.
 the platform comprises a planar topside and a planar underside;
 the interior cooling passage comprises a serpentine interior cooling passage; and
 in use, the interior cooling passage is configured to have a coolant flow direction and, relative to the coolant flow direction, the high-pressure coolant region comprises an upstream portion of the interior cooling passage and the low-pressure coolant region comprises a downstream portion of the interior cooling passage.

3. The platform cooling arrangement according to claim 1, wherein;
 the platform underside comprises an axially and circumferentially extending planar surface; and
 the plate topside comprises an axially and circumferentially extending planar surface.

4. The platform cooling arrangement according to claim 1, wherein the channel formed in the plate topside comprises a serpentine channel.

5. The platform cooling arrangement according to claim 4, wherein:
 the airfoil comprises a pressure side and a suction side;
 a pressure side slashface comprises a platform edge that corresponds with the pressure side of the airfoil; and
 the plate is located on a region of the platform underside that corresponds with the pressure side of the airfoil.

6. The platform cooling arrangement according to claim 5, wherein, in relation to the forward and aft directions of the rotor blade, the upstream end of the channel comprises a forward position and the downstream end of the channel comprises an aft position.

7. The platform cooling arrangement according to claim 5, wherein, in profile, the plate comprises a curved edge and a straight edge, the curved edge approximately corresponding in shape to the curved profile of the airfoil where the airfoil connects to the platform, and the straight edge approximately corresponding in shape to the linear profile of the pressure side slashface; and
 wherein the positioning of the curved edge and the straight edge of the plate is offset in relation to the positioning of the curved profile of the airfoil and the linear profile of the pressure side slashface.

8. The platform cooling arrangement according to claim 7, wherein the channel comprises a slashface section, the slashface section comprising a section of the channel that resides in proximity and parallel to the straight edge of the plate.

9. The platform cooling arrangement according to claim 8, wherein an upstream end of the slashface section resides in proximity to the upstream end of the channel;
 wherein the length that the slashface section resides in proximity and parallel to the straight edge of the plate comprises a slashface section channel length; and
 wherein the slashface section channel length comprises greater than 0.75 of the length of the pressure side slash face.

10. The platform cooling arrangement according to claim 8, wherein, from the slashface section, the channel comprises a first switchback and, downstream of the first switchback, an internal section that resides in the central area of the plate;
 wherein the internal section includes a linear section immediately downstream of the first switchback and a second switchback downstream of the linear section; and
 wherein the second switchback resides in proximity to the downstream end of the channel.

11. The platform cooling arrangement according to claim 8, wherein:
 the upstream end of the channel comprises an upstream plenum of increased channel width;
 the downstream end of the channel comprises a downstream plenum of increased channel width; and
 the high-pressure connector connects to the upstream plenum and the low-pressure connector connects to the downstream plenum.

12. The platform cooling arrangement according to claim 1, wherein the plate comprises an outer sidewall, the outer sidewall comprising a solid wall that extends uninterrupted around the periphery of the plate.

13. The platform cooling arrangement according to claim 12, wherein the high-pressure connector includes a first underside channel formed on the platform underside, the first underside channel being open through the platform underside such that, upon attaching the plate to the platform underside, the plate topside comprises an underside channel floor for at least a portion of the first underside channel;
 wherein the low-pressure connector comprises a second underside channel formed on the platform underside, the second underside channel being open through the platform underside such that, upon attaching the plate to the platform, the plate topside comprises an underside channel floor for at least a portion of the second underside channel.

14. The platform cooling arrangement according to claim 13, wherein a downstream end of the first underside channel overlaps axially and circumferentially, at least in part, with the upstream end of the channel, while each is offset from the other in the radial direction; and wherein an upstream end of the second underside channel overlaps axially and circumferentially, at least in part, with the downstream end of the channel, while each is offset from the other in the radial direction.

15. The platform cooling arrangement according to claim 1, wherein the plate comprises an outer sidewall, the outer sidewall including a sidewall inlet and a sidewall outlet that extend therethrough;

wherein the sidewall inlet is configured to connect the upstream end of the channel to the high-pressure connector; and wherein the sidewall outlet is configured to connect the downstream end of the channel to the low-pressure connector.

16. The platform cooling arrangement according to claim 1, wherein the plate is attached to the platform such that the channel is sealed; wherein, in operation, the seal is configured such that substantially all of the coolant that flows into the channel from the high-pressure connector is directed into the low-pressure connector after passing through the channel; and wherein detachably connected comprises one of a welding connection, a brazing connection, an adhesive connection, and a mechanical retainment connection.

17. A method of creating a platform cooling arrangement for a turbine rotor blade having a platform at an interface between an airfoil and a root, wherein the rotor blade includes an interior cooling passage formed therein that extends from a connection with a coolant source at the root to at least the approximate radial height of the platform, wherein, in operation, the interior cooling passage comprises at least a high-pressure coolant region and a low-pressure coolant region, and wherein the platform includes a platform underside along an inboard surface, the method comprising the steps of:

machining a high-pressure connector that connects an outlet to a high-pressure coolant region of the interior cooling passage, the outlet being positioned in a first predetermined location inboard of the platform;

machining a low-pressure connector that connects an inlet to the low-pressure coolant region of the interior cooling passage, the inlet being positioned in a second predetermined location inboard of the platform;

affixing a topside of a plate to the platform underside, the plate comprising a channel formed on the plate topside that includes an upstream end and a downstream end, the channel being open through the plate topside such that, upon attaching the plate to the platform, the platform underside comprises a channel ceiling;

wherein the plate is configured such that the upstream end of the channel connects to the outlet of the high-pressure connector, and the downstream end of the channel connects to the inlet of the low-pressure connector; and wherein the channel comprises a serpentine channel.

18. The method of creating a platform cooling arrangement according to claim 17, wherein, in profile, the plate comprises a curved edge and a straight edge, the curved edge approximately coinciding in shape to the curved profile of the airfoil where the airfoil connects to the platform;

further comprising the steps of:

machining a flat pocket in the platform underside in a location that approximately corresponds with a pressure side of the airfoil, the flat pocket having a profile shape that corresponds with the profile of the plate; and sealing the channel such that, in operation, substantially all of the coolant flowing through the channel is returned to the interior cooling passage, wherein the plate is attached to the platform underside such that the plate resides in the flat pocket.

19. The method of creating a platform cooling arrangement according to claim 18, wherein the channel comprises a slashface section, the slashface section comprising a section of the channel that resides in proximity and parallel to the straight edge of the plate; and wherein an upstream end of the slashface section resides in proximity to the upstream end of the channel.

20. The method of creating a platform cooling arrangement according to claim 17, wherein the method is used to retrofit the platforms of existing turbine rotor blades.

* * * * *

UNITED STATES PATENT AND TRADEMARK OFFICE
CERTIFICATE OF CORRECTION

PATENT NO. : 8,777,568 B2  Page 1 of 1
APPLICATION NO. : 12/894993
DATED : July 15, 2014
INVENTOR(S) : Ellis et al.

It is certified that error appears in the above-identified patent and that said Letters Patent is hereby corrected as shown below:

In the Specification

In Column 2, Line 65, delete "itself 110." and insert -- 110 itself. --, therefor.

In Column 3, Line 10, delete "blade 110" and insert -- blade 100 --, therefor.

In Column 6, Line 9, delete "platform 116," and insert -- platform 110, --, therefor.

In Column 7, Line 17, delete "end of 138" and insert -- end 138 of --, therefor.

In Column 7, Line 32, delete "straight edge 151" and insert -- straight edge 152 --, therefor.

In Column 8, Line 65, delete "underline" and insert -- underside --, therefor.

In Column 9, Line 43, delete "rotor blades 110," and insert -- rotor blades 100, --, therefor.

In the Claims

In Column 11, Line 39, in Claim 2, delete "components." and insert -- components; --, therefor.

In Column 11, Line 51, in Claim 3, delete "wherein;" and insert -- wherein: --, therefor.

Signed and Sealed this
Fourteenth Day of April, 2015

Michelle K. Lee
*Director of the United States Patent and Trademark Office*